No. 12,437. REISSUED JAN. 16, 1906.

J. M. M. TRUFFAULT.

FRICTIONAL RETARDING MEANS FOR SPRING VEHICLES.

APPLICATION FILED JUNE 9, 1905.

2 SHEETS—SHEET 1

Witnesses.
Chas. D. King
Adolph F. Jones

Inventor
Jules Michel Marie Truffault
by Dunn & Turk
Attys.

No. 12,437. REISSUED JAN. 16, 1906.

J. M. M. TRUFFAULT.

FRICTIONAL RETARDING MEANS FOR SPRING VEHICLES.

APPLICATION FILED JUNE 9, 1905.

2 SHEETS—SHEET 2.

Witnesses:
Chas. D. King.
Adolph F. Dinse,

Inventor:
Jules Michel Marie Truffault
by Dum + Turk
Attys.

UNITED STATES PATENT OFFICE.

JULES MICHEL MARIE TRUFFAULT, OF PARIS, FRANCE, ASSIGNOR OF FIFTY-ONE ONE-HUNDREDTHS TO EDWARD VASSALLO HARTFORD AND FORTY-NINE ONE-HUNDREDTHS TO GEORGE H. HARTFORD, BOTH OF ORANGE, NEW JERSEY.

FRICTIONAL RETARDING MEANS FOR SPRING-VEHICLES.

No. 12,437. Specification of Reissued Letters Patent. Reissued Jan. 16, 1906.

Original No. 695,503, dated March 18, 1902. Application for reissue filed June 9, 1905. Serial No. 264,523.

*To all whom it may concern:*

Be it known that I, JULES MICHEL MARIE TRUFFAULT, engineer, of 51 Avenue des Ternes, in the city of Paris, Republic of France, have invented Improvements in Frictional Retarding Means for Spring-Vehicles, of which the following is a full, clear, and exact specification.

This invention relates to the class of vehicles in general wherein springs are employed to relieve jolting and vibration, and particularly motor cars and cycles of the various well-known kinds. Notwithstanding the use of springs for supporting the bodies of such vehicles, much inconveninece is felt from the shocks and vibrations due to the wheels, and particularly the front steering wheel or wheels, striking obstructions in the road.

The object of the present invention is to overcome or materially modify these shocks and vibrations by combining with the spring-supporting devices certain frictional devices between the moving parts or between the running-gear and the spring-supported parts, whereby said frictional devices serve as brakes to retard the too-rapid vibration or movement of the parts.

The invention may be embodied in various ways and by details of mechanism which vary, the particular construction depending to a considerable extent on the kind of vehicle to which it is applied.

In the accompanying drawings the invention is shown as embodied in a motor-tricycle and as applied to the front thereof.

Figure 1:
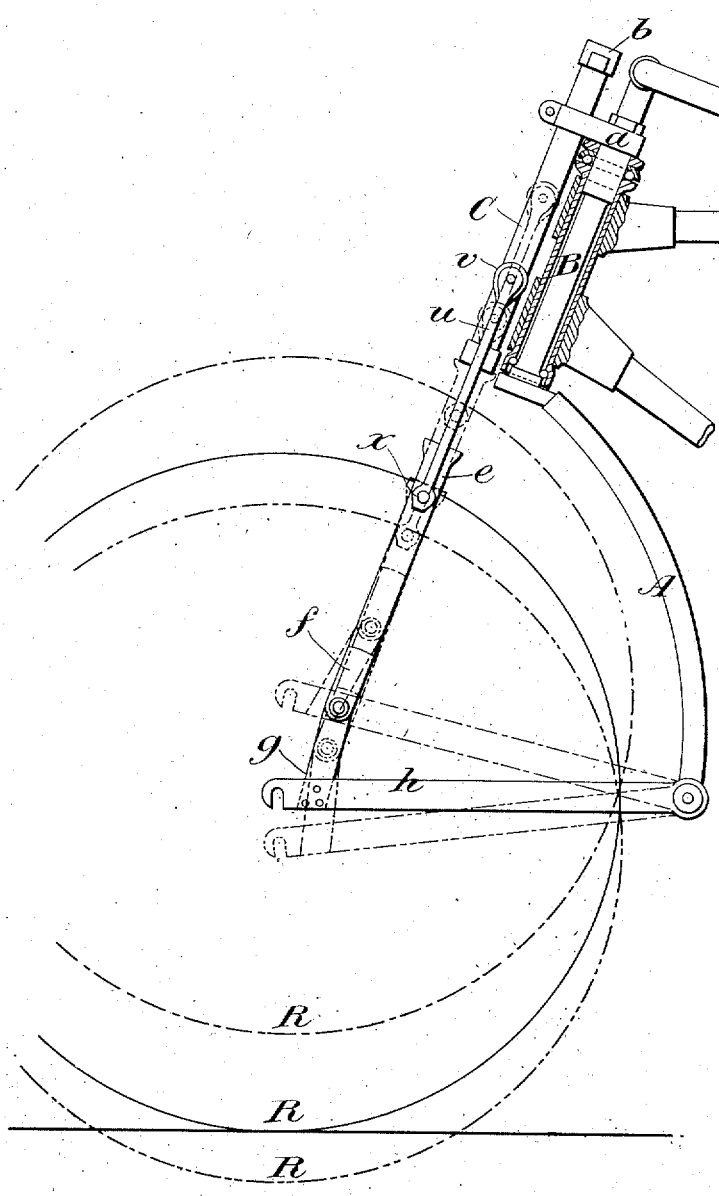
Figure 2:
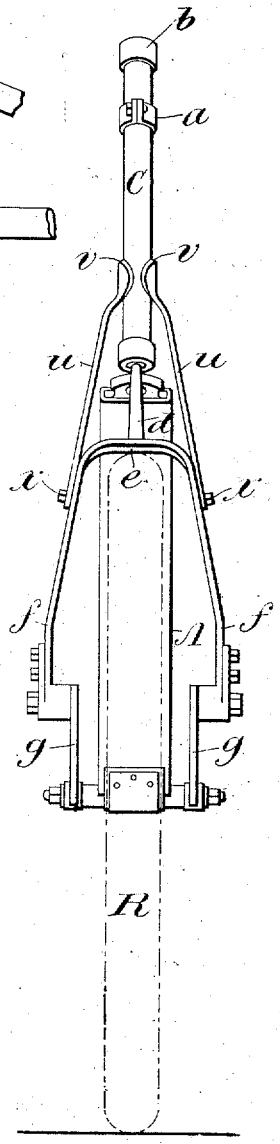
Figure 3:
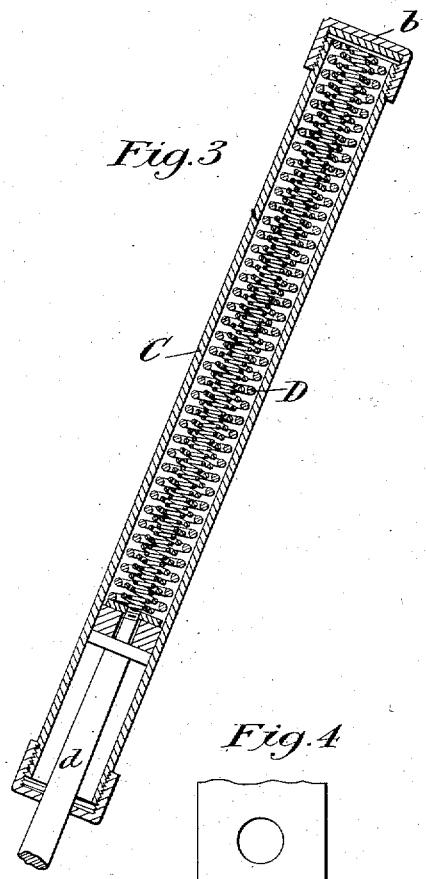
Figure 6:
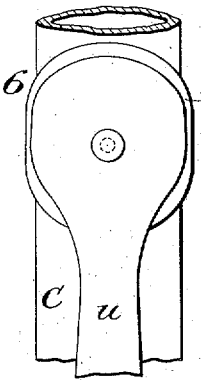
Figure 7:
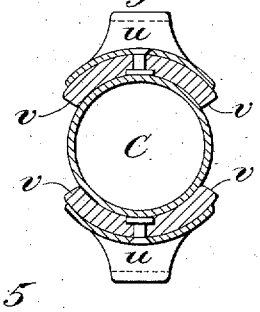
Figure 4:
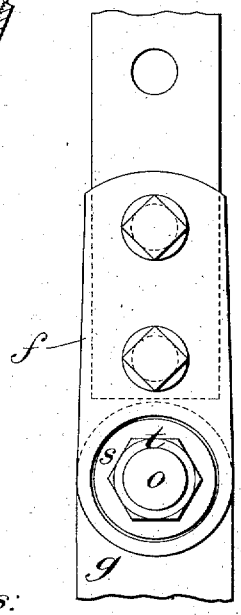
Figure 5:
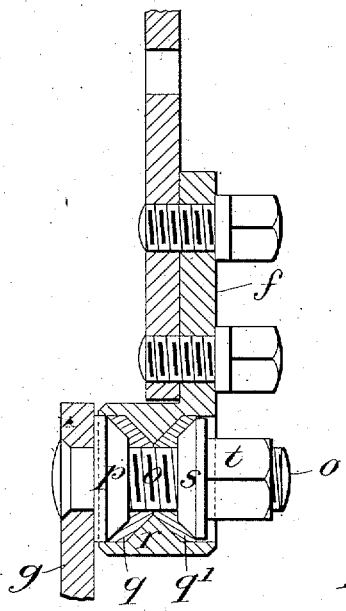

In said drawings, Figure 1 is a side elevation of the front portion of the tricycle, showing the mountings of the front wheel thereof; and Fig. 2 is a front elevation of the same parts. These views are on a small scale. Fig. 3 is a sectional view of the spring-casing and springs. Figs. 4 and 5 are respectively a side elevation and sectional view of the connection of the spring with the running-gear, to be hereinafter described. Figs. 6 and 7 are respectively a side elevation and transverse section of the frictional joint couplings or connections.

B is the steering-stem, mounted to rotate axially in the tubular frame member as usual, and A is a curved arm or bar secured rigidly to the lower end of the stem B and extending downward back of the wheel R, which latter is indicated merely diagrammatically in Figs. 1 and 2. The bar A has jointed to it two arms *h*, which embrace the wheel R and extend forward to the hub thereof. The movements of the wheel up and down, as indicated by dotted lines in Fig. 1, cause the arms *h* to move or swing about their jointed connections with the lower end of the bar A.

Mounted in front of the stem B and secured thereto by a collar *a* is a spring-casing C in the form of a tube and seen detached in Fig. 3. In this casing is a piston *c* on a piston-rod *d*, which extends down out of the lower end of the casing C and is coupled to a fork *e*, the branches *f f* of which extend down at the sides of the wheel, Fig. 2, and are jointed, respectively, to arms or branches *g* on and forming parts of the arms *h*. In the casing C is a compression-spring D, situated between the piston *c* and the cap *b* on the upper end of the casing. From the respective branches *f* of the fork *e* arms *u*, secured to the branches at *x*, extend up to the casing C and carry at their upper ends pads *v*, which bear yieldingly on said casing.

The specific details of the construction will now be described with reference to Figs. 3 to 7, which show them on a scale larger than that of the principal views. As seen in Fig. 3, the spring D is made of two or more coil-springs, one within the other and preferably coiled in opposite directions. Preferably, also, the outer spring will be of thicker wire than the one next inside of it, and this latter will be of thicker wire than that one within it, so that the power to resist compression will be about equal in all the springs. The chamber in the casing C occupied by the spring will be filled with grease of about the consistency of butter, this grease filling all the space not occupied by the spring itself. When the wheel R is driven upward by an obstruction, the spring yields under the upward pressure of the piston *c*; but the friction of the latter in the casing and the movement of the coils of the spring in the thick grease will offer a yielding resistance and tend to retard the movement. The pads *v* on the arms *u* are of some soft material—as leather, for example—and these pads press yieldingly on the surface of the casing C with a gripping pressure, thus also aiding by friction to retard the upward movement of the wheel R with a yielding resistance and coöperating with the retarding-spring. The frictional devices at the joints where the arms *h* are coupled—at one end to the bar A and at the other end through the lugs *g* to the branches *f* of the fork—are illustrated in detail in Fig. 5. A bolt *o*, fixed at its head in the lug *g* and having a conical part *p*, is provided with a splined conical washer *s* and a nut *t*. The eye *r*, through which the bolt *o* passes, is conically countersunk at its opposite ends and provided with leather washers *q q'*. When the bolt is in place and the nut *t* screwed up, the cones *p* and *s* bear frictionally on the washers and offer yielding resistance to the rotation of the bolt in the eye, thus coöperating with the other frictional devices. This rotating friction device, as will be readily seen, posesses numerous advantages in that the frictional tension may be easily regulated and such wear as occurs therein taken up and compensated for by merely tightening the nut *t*. Furthermore, the movement of the frictional contact-surfaces is relatively small compared with the movement of the parts between which they are interposed, and thus excessive wear is avoided. An additional advantage accrues from the rotary type of device in that substantially the whole area of the wearing-surfaces are in constant contact, and therefore they wear evenly. Obviously this device for producing a frictional yielding resistance to the movements of the spring-supported parts of a vehicle may be applied in various ways according to the particular construction and the arrangement of the parts of the vehicle, and it may be used with or without the other frictional devices heretofore described. In this application, however, I make no specific claim to the several other specific forms of retarding devices, but confine myself to the forms which are pointed out in the claims.

I am aware, of course, that in spring-vehicles as now constructed there will often be found an immaterial amount of friction at the connecting-points between the parts which move relatively to each other; but this friction produces no useful result or effect whatever, whereas in my construction the yielding friction is very material, and while permitting the spring to compress and expand smoothly it exerts at all times a uniform retarding or slowing effect thereon when the spring expands, while it coöperates with the spring when the latter is under compression. Obviously the effect of my invention will be to materially modify the functions of the spring and cause it to act more slowly, but at the same time permit it to act smoothly and evenly. Obviously, also, the yielding friction must be regularized and uniform and not arbitrary and irregular in action.

I am also aware that friction devices for retarding or dampening the action of spring-supports in vehicles is not, broadly, new; but so far as I am aware I am the first to provide a rotating device of this character which possesses the numerous advantages above set forth.

Having thus described my invention, what I claim, and desire to secure by Letters Patent, is—

1. In a vehicle, the combination with a supporting-spring between the parts of the vehicle movable relatively to each other, of rotating frictional means between the parts which provides a yielding resistance to movement, said means producing a retarding effect on the reaction of the spring, substantially as described.

2. In a vehicle, the combination with the wheel thereof, the frame carried by said wheel and a spring interposed between said wheel and frame, of rotating frictional mechanism which provides a yielding resistance to the movements of the parts, said means serving to materially and uniformly exert a retarding effect on the said movements of the parts in both directions, substantially as described.

3. A retarding device for vehicle-springs comprising rotating friction members, adjustable clamping means, and means for connecting the rotating members to the parts of a vehicle movable relatively to each other, substantially as described.

4. A retarding device for vehicle-springs, comprising a plurality of friction members, means for regulating the pressure between said members, and arms for connecting the said members to the parts of a vehicle movable relatively to each other, so that the movement of the friction members is less than the relative movement of the spring-separated parts, substantially as described.

5. A retarding device for vehicle-springs comprising a plurality of friction members, adjustable means for regulating the pressure between said members, and operating means for connecting said members to the parts of a vehicle between which the springs are interposed, the contacting area of the friction-surfaces of said members being substantially unvarying and uniform in extent irrespective of the relative position of said members, substantially as described.

6. A retarding device for vehicle-springs comprising a pair of rotating friction members, friction material between said members, a clamping-bolt for holding the parts together, and arms for connecting said friction members to the parts of the vehicle between which the springs are interposed, substantially as described.

7. A retarding device for vehicle-springs, comprising a plurality of friction members, means for regulating the pressure between said members, and arms for connecting the said members to the parts of a vehicle movable relatively to each other, the parts being so arranged that the movement of the friction members is less than the relative movement of the spring-separated parts, and a hinged connection at the outer end of one of said arms, substantially as described.

8. A retarding device for vehicle-springs comprising a pair of rotating friction members, friction material between said members, a clamping-bolt for holding the parts together and arms for connecting said friction members with the parts of the vehicle between which the springs are interposed, and a hinged connection on the outer end of one of said arms, substantially as described.

9. In a vehicle, the combination with a supporting-spring between the parts of the vehicle movable relatively to each other, of a plurality of friction members, means for regulating the pressure between said members, and means for connecting the friction members to the vehicle, the said members being so arranged as to produce a retarding effect upon the action of the spring and the contacting area of the friction-surfaces of the said members being substantially uniform and unvarying in extent, irrespective of the relative positions of the parts, substantially as described.

10. In a vehicle, the combination with a supporting-spring between the parts of the vehicle movable relatively to each other, of a plurality of friction members, means for regulating the pressure between said members, and means for connecting the friction members to the vehicle, the said members being so arranged as to produce a retarding effect upon the action of the spring, and the connecting means being arranged so that the movement of the friction members is less than the relative movement of the spring-separated parts, substantially as described.

11. In a vehicle, the combination with the wheel, the frame, the arms pivoted to the frame at one end, and the spring between said arms and frame, of the frictional pivot-bearings between the arms and the frame, each of these bearings comprising a bolt *o*, fixed in one of the parts and bearing cones *p* and *s*, and a nut *t*, the said cones and nut, and the coned leather washers *q* and *q'* in the eye of the other part, substantially as described.

In testimony whereof I have hereunto set my hand in the presence of two subscribing witnesses.

JULES MICHEL MARIE TRUFFAULT.

Witnesses:
HANSON C. COXE,
JOHN BAKER.